Patented June 5, 1951

2,555,506

UNITED STATES PATENT OFFICE 2,555,506

BONDED LAMINAE AND METHOD OF MAKING SAME

Donald H. Powers, Winchester, Mass., assignor to Monsanto Chemical Company, St. Louis, Mo., a corporation of Delaware No Drawing. Application July 8, 1947, Serial No. 759,709

17 Claims. (Cl. 154—138)

The present invention relates to improved laminated products and methods for making such products, and, more particularly, to improved cellulosic material laminates and methods for making such laminates wherein a contact pressure type resin is employed as the bonding agent.

Heretofore, contact pressure type resins have been employed successfully in the lamination of glass fabrics and the like, but have not proven satisfactory as bonding agents in the lamination of cellulosic fabrics and paper particularly when the resulting laminates were used in the presence of moisture, even when such moisture was present in amounts normally encountered under conditions of generally prevailing relative humidities. Under these conditions the fabric and paper laminates exhibit objectionable water absorption and loss of edgewise compressive strength. Moreover, for some uses the flexural strength of such laminates is not considered satisfactory.

Accordingly, it is an object of the invention to prepare bonded laminae of cellulosic materials possessing increased resistance to water absorption and a superior flexural and edgewise compressive strength, particularly when said laminae are bonded by means of a contact pressure type resin.

Another object of the invention is to provide a method of producing bonded laminae of cellulosic materials possessing increased resistance to water absorption and superior flexural and edgewise compressive strength, by the employ of a silica sol as a treating agent for the laminae of cellulosic materials and a bonding agent such as a contact pressure type resin.

Other objects and advantages of the invention will appear in the following description and the appended claims.

In general, the invention is preferably carried out in accordance with the method and modifications set forth below although other methods may be used and other modifications will be apparent to those skilled in the art.

A lamina of cellulosic material, preferably a cotton duck, is treated by immersion, spraying or the like with a solution of colloidal silica. Excess solution and solids in solution are removed preferably by squeeze rolls (padding) so that the extracted fabric retains from 1 to 15% solids. This range of solids is preferred, but it is obvious that a higher or lower percentage may be used. Solution extraction can also be accomplished by centrifuging, wringing, hand squeezing and the like. The wetted material is dried in any suitable manner preferably at 200 to 225° F., but other drying temperatures and even room temperature may be used depending upon operational requirements and equipment limitations.

The dry silica sol treated fabric is impregnated, preferably saturated, by coating it with a suitable contact pressure type resin, for example a liquid resin comprising a mixture of a polyester condensation product and a vinyl compound. Coating or impregnating can be accomplished in any suitable manner, for example, by hand application or by coating apparatus of various types, but in any case it is preferred that the laminated product contain from 45 to 65% resin although other percentages of resin may be used. Within practical limits almost any number of fabrics or papers prepared as described above can be laminated by the proper application of heat either with or without pressure.

In carrying out the invention a variety of moulding techniques may be used including for example, contact laminating in which the relatively recently developed rubber bag or blanket technique is generally employed. This technique is preferably used to produce laminates having compound curvatures, sharp bends, angles and the like, especially when a low pressure or contact pressure type resin is employed as the bonding agent as is true in the present invention. In general, contact laminating is defined as a method of lamination in which pressures not in excess of 1 atmosphere are employed. Such pressures are generally attained by drawing a vacuum between the rubber bag or blanket and the laid-up plies. Contact pressure type resins normally require heat for polymerization and such heat is occasionally supplied directly to metal forms which are suitably cored when necessary. However, in most instances the whole assembly is placed in a suitable oven where the required curing heat is supplied. Some contact pressure type resins do not require the application of heat for curing purposes since the addition of a catalyst alone can bring about the cure.

Moreover, it is also possible to use high pressure laminating equipment. For example, a sheet of combined laminae may be prepared by laying strips of resin coated fabric or filler with alternate plies arranged at right angles to the warp direction, wrapping the whole in cellophane, and then curing between metal plates or platens in a press at temperatures of 110 to 115° C. for about 10 minutes by the application of a small amount of pressure in excess of atmospheric pressure. The above conditions may be varied depending upon the type resin being used and the number of laminae being bonded and, if desired, exceedingly high pressures may be used.

Laminating conditions or processes can be varied from those described above, if desired, depending upon the number of plies being laminated; the type fabric or paper used; the intended use of the laminate; the type finish required; the type resin used; and other factors apparent to those skilled in the laminating art.

For convenience, the invention is described with reference to a cotton duck having a definite construction although other types of cellulosic fabrics, fabric paper combinations and papers may be laminated successfully. The above duck has the following characteristics: it is framed to 34.5 inches; it has a weight of 9.4 oz. per linear yard and a thread count of 84/28; the warp yarn count is 13½ one ply and the filling yarn count is 12 two ply; the twist multiple for warp and filling yarns is 4.75; and the cotton used is strict low middling $1\tfrac{5}{16}''$ staple. A fabric of this type can be utilized in the griege or after a "boil off" and chlorine or peroxide bleach. In the examples, the term "9.4 oz. duck" is intended to mean a duck constructed in accordance with the above requirements and "boiled off" and chlorine bleached.

The term "Fabric" as used in the description and appended claims is intended to cover woven fabric, knitted fabrics and paper and combinations of such materials.

The preferred treating agent for the cellulosic materials is a silica sol preferably prepared in accordance with the disclosure of the patent to John F. White, No. 2,375,738 and is described in detail in Example I. Other silica sols prepared, for example, by reacting water-soluble silicates with an acid and subjecting the acidified silicate to treatment with alcohol and/or cooling to remove the electrolyte, as described in the patent to Morris D. Marshall, No. 2,285,449 and the patent to John F. White, No. 2,285,477, may be used if desired. The preferred sols, as employed herein, have a pH ranging from about 7 to 10 as initially prepared. If a sol with a lower pH is employed, for example, an acid reacting sol, obtained by carefully acidifying the above sols, it may be applied to the fabric at a pH of from 4 to 7 depending on requirements and the most suitable pH for the fabric being treated.

When employed as sizing agents for fabrics or paper, the preferred silica sols are preferably utilized in the form of aqueous solutions containing from 2 to 20% solids although the solution need not be aqueous and may contain a wider percentage range of solids. The amount of silica retained in the fabric can be controlled by varying the degree of pick up when employing a solution of fixed concentration or by varying the concentration of solution with a fixed degree of pick up.

The characteristics of resins of the contact pressure type have been briefly discussed hereinbefore. However, it is emphasized that such resins, when employed as laminating bonding agents, require very little pressure during the laminating process and are commonly referred to as no-pressure resins or resins requiring one atmosphere of pressure or less during the laminating process, particularly when the rubber bag or blanket technique is employed. However, it is desirable in some instances to use pressures in excess of atmospheric pressure when the bonding step is carried out by the employ of a press wherein the laminae are pressed between metal plates or platens particularly when a large number, that is from 6 to 10 or more laminae are bonded together.

The preferred contact pressure type resin for the purpose of this invention is a liquid resin (preferably a non-aqueous and less polar resin than resins of the phenolic or amino-plast type) comprising a mixture of a polyester condensation product and a vinyl compound although other contact pressure type resins such as alkyd resins, allyl resins and the like may be used. Preferred liquid resins of the above type are in general substantially completely copolymerized during the curing operation with little if any of the original constituents present in an unreacted condition in the cured resin. Moreover, when the preferred liquid resins are subjected to heat in the presence of a small amount of a peroxide catalyst, for example about 0.5 to 1% by weight of benzoyl peroxide, a copolymerization between the polyester and vinyl compound is effected whereby no volatile reaction products are released and under the proper conditions no counter pressure is necessary in curing, in contrast to phenolic and amino-plast resins. For use according to the invention, liquid resins of the above preferred type comprising from 70 to 80% polyester and from 30 to 20% of a vinyl compound and having a viscosity of 10 poises or less at 25° C. (Gardner-Holdt viscosimeter) are preferred.

In general, the above polyester condensation product is prepared by reacting with stirring a polybasic acid such as an $\alpha$-$\beta$ unsaturated organic acid, for example, maleic acid, either with or without the addition of a dicarboxylic acid, for example phthalic acid, with a polyhydric alcohol preferably a glycol such as ethylene glycol, in an inert atmosphere, for example carbon dioxide, nitrogen and the like. The reaction is preferably carried out under an air condenser permitting escape of evolved water. If a dicarboxylic acid such as phthalic acid is added, at least 20 mol per cent of the polybasic acid constituents of the polyester should be an $\alpha$-$\beta$ unsaturated organic acid such as maleic acid. The reaction temperature is preferably from 160° to 200° C. and the reaction time is of such duration that the resulting polyester has an acid number (KOH equivalent in milligrams per gram of the reaction mixture) of from 50 to 80. However, other operating conditions may be used depending upon the characteristics desired in the polyester product. In addition to the above reactants or even in lieu of dicarboxylic acids such as phthalic acid, long chain aliphatic acids or the corresponding glycerides may be used to give condensation products having modified properties.

In place of maleic acid, dicarboxylic aliphatic acids generally which have ethylenic unsaturation and not over 8 carbon atoms or the anhydride thereof may be used. As examples of such acids may be mentioned maleic acid, fumaric acid, citraconic acid, mesaconic acid, methyl ethyl maleic acid, diethyl maleic acid and the like. A particularly preferred group of acids or anhydrides comprise the compounds having the general formula

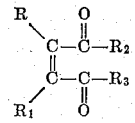

wherein R and $R_1$ are hydrogen, halogen or alkyl groups having not over two carbon atoms and $R_2$ and $R_3$ are OH or $R_2$ and $R_3$ together stand for oxygen.

As examples of dicarboxylic acids or anhydrides may be mentioned phthalic acid, terephthalic acid and the like.

As examples of glycols, may be mentioned ethylene glycol, diethylene glycol, propylene glycols such as 1,2- and 1,3-propanediol; butylene glycols such as 1,2-butanediol, 1,3-butanediol and 1,4-butanediol; triethylene glycols and the like.

Long chain aliphatic acids may be incorporated in the polyester condensation product prior to reacting the constituents of the mixture. As examples of long chain monocarboxylic acids may be mentioned saturated aliphatic acids such as decanoic acid, pentadecanoic acid and the like; these acids may have straight or branched chains or substituted chains, for example substituted with halogen or hydroxy groups as, for example, monochlor-octadecanoic acid, 12 dihydroxy octadecanoic acid and the like; unsaturated aliphatic acids, for example, monoolefinic-unsaturated aliphatic acids such as 7 hexadecenoic acid, 10 undecenoic acid; diolefinic-unsaturated aliphatic acids such as 9,12-octadecadienoic acid; triolefinic-unsaturated aliphatic acids such as 9,12,15-octadecatrienoic acid; substituted olefinic acids, for example such hydroxy acids as 16-hydroxy-7-hexadecenoic acid; halogenated acids, such as for example, monochlor-9-octadecenoic acid and acids derived by dehydrogenation of castor oil acids followed by chlorination.

Although styrene is preferably admixed with the above polyester condensation products to form the liquid resins for use according to the invention, other vinyl compounds such as substituted styrenes, vinyl esters and the like may be used although it is preferred to use some styrene with these compounds. A preferred group of vinyl compounds comprise alpha substituted ethylene compounds having the general formula

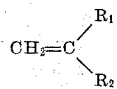

wherein $R_1$ is a negative group such as aryl, vinyl, ethyl, carboxyl, halogen, halovinyl, acyloxy or carbalkoxy and $R_2$ is hydrogen or an alkyl group. Vinyl compounds of the above type should preferably be miscible with the polyester and capable of cross-linking the polyester molecules.

A further understanding of the invention will be obtained from the following examples:

EXAMPLE I

*Preparation of silica sol*

Seventy-three pounds of 66° Bé. $H_2SO_4$ are diluted with 358 pounds of water and charged to a mixing tank. Four hundred and seventy-two pounds of a sodium silicate solution analyzing 8.9% $Na_2O$ and 29% $SiO_2$ are diluted with 377 pounds of water and added with stirring to the acid solution. The mixture sets to a gel in a few minutes after the mixing is completed. After 16 hours aging, the syneresis liquor is siphoned off and the gel crushed to one inch lumps. These lumps are washed with a continuous flow of water for 16 hours. The washed gel is then covered with 750 pounds of water containing 0.9 pounds of NaOH. After standing 6 hours the excess solution is drained off and a portion of the gel charged to an autoclave. The gel is heated for 3 hours, using steam at 215 pounds per square inch absolute pressure in the jacket of the autoclave. The contents of the autoclave are then blown out and the small amount of residual, undispersed gel removed by filtration. The colloidal solution so produced contains about 12.5% $SiO_2$ and can be diluted to a concentration as low as 0.1% if desired.

EXAMPLE II

*Preparation of contact pressure liquid resin*

Four gram mols of maleic anhydride and 2 gram mols of phthalic anhydride are reacted with stirring with 6 gram mols of ethylene glycol in an inert atmosphere of carbon dioxide under an air condenser which allows escape of evolved water. The mixture is maintained at a temperature of about 200° C. for a period of approximately 8 hours or preferably until the acid number of the linear polymer formed is about 50. Seventy-five per cent of the resulting polymer is admixed with 24.5% styrene plus 0.5% of benzoyl peroxide as a catalyst and a clear yellowish liquid is obtained, said liquid preferably having a viscosity of 4 poises at 25° C. (Gardner-Holdt viscosimeter).

If desired, the ratio of maleic anhydride may be varied but at least 20 mol per cent of the polybasic constituent of the polyester should be maleic anhydride. Moreover, the combined ratio of gram mols of the two anhydrides to gram mols of ethylene glycol is preferably 1:1.

EXAMPLE III

A 9.4 oz. cotton duck is treated (sized) in an aqueous bath containing 12.5% colloidal silica as prepared in Example I and is padded to approximately 100% pick up so that the duck retains about 12.7% solids. Drying is accomplished at a temperature preferably of 225° F. The dry material is then saturated with a weighed amount of liquid resin having a viscosity of 4 poises and prepared as described in Example II, calculated to produce a finished laminate containing 55% resin and 45% fabric and sizing by weight. The resin is applied by hand coating using a metal scraper. Ten fabrics prepared in this manner are laminated by laying alternate plies at right angles to the warp direction, wrapping the whole in cellophane, placing between polished metal plates in a press and curing at temperatures of 110° to 115° C. for 10 minutes at pressures of 25 to 35 p. s. i. The 10 ply laminates have a thickness of about 0.20 inches.

Another 9.4 oz. duck is prepared and laminated in exactly the same manner except that it is padded to retain 10.6% silica instead of 12.7% silica.

An unsized 9.4 oz. duck is laminated exactly as described above.

A 9.4 oz. duck is sized to retain 5.5% starch and is otherwise treated and laminated in precisely the same way as the silica sol sized cotton duck.

The following table shows the effect of sizing or non-sizing on the flexural and edgewise compressive strength of the laminate in a dry or wet condition:

|  | Per Cent Resin in Laminate | Edgewise Compressive Strength | | | Flexural Strength | | |
| --- | --- | --- | --- | --- | --- | --- | --- |
|  |  | Dry | After Soaking 24 hrs. | Soaked and Dried | Dry | After Soaking 24 hrs. | Soaked and Dried |
| Untreated | 55 | 9,400 | 6,500 | 10,000 | 12,000 | 12,000 | 14,900 |
| Starch sized | 55 | 5,700 | 2,000 | 5,700 | 11,000 | 6,399 | 11,000 |
| Silica Sol 12.7% | 55 | 12,500 | 10,200 | 11,400 | 17,800 | 15,700 | 19,000 |
| Silica Sol 10.6% | 55 | 13,800 | 10,000 | 14,000 | 16,000 | 15,500 | 17,600 |

The soaked laminate prepared from silica sized fabrics possesses a flexural and edgewise compressive strength greater than the unsized or starch sized laminate in the dry state. Moreover, a comparison of the various laminates under each of the above test conditions clearly indicates the superior strength of the silica sized laminates.

The edgewise compressive strength was determined in accordance with A. S. T. M. testing method D-695-44T and the flexural strength was determined in accordance with A. S. T. M. testing method D-790-45T. In both cases cut specimens of the laminates were tested by means of a Baldwin Southwark Universal tester of 60,000 pounds testing range at a cross head speed of 0.05 inches per minute.

The values given in the above table represent the average for 10 test specimens. The "dry" results represent specimens tested after a standard conditioning at 50° C. for 48 hours followed by cooling over calcium chloride. The values obtained "after soaking for 24 hours" are self-explanatory. "Soaked and dried" results are obtained by testing specimens which have been immersed or soaked in water for 24 hours followed by drying for 3 hours at 105° C., then by further drying at 50° C. for 48 hours and cooling over calcium chloride.

EXAMPLE IV

Unsized, starch sized, 10.6% silica sized and 12.7% silica sized 9.4 oz. duck laminates are prepared in the same manner and employing the same resin as set forth in Example III except that the laminates contain 6 plies instead of 10. The 6 ply laminates have a thickness of about 0.12 inches.

The following table shows the effect of sizing or non-sizing treatments on the water absorption of the finished laminate:

|  | Per Cent Resin in Laminate | Water Absorption, Per Cent Gain in Weight, 24 Hour Immersion |
|---|---|---|
| Untreated | 55 | 5.8 |
| Starch 5.5% | 55 | 9.9 |
| Silica Sol 10.6% | 55 | 4.1 |
| Silica Sol 12.7% | 55 | 4.7 |

The silicate sized laminates have a water absorption of from 20 to 30% less than the unsized laminate and from 50 to 60% less than the starch sized laminates. Moreover, the electrical properties of the silica sized laminates are found to be improved particularly when such laminates are employed under conditions of normal or high relative humidities.

The water absorption test consisted in immersing standard specimens having dimensions of 1" x 3" x 8" for a period of 24 hours and then determining the percentage gain in weight. The results represent the average of three test specimens for each category of laminate. This test was conducted in accordance with standard A. S. T. M. testing methods.

EXAMPLE V

A 9.4 oz. duck is impregnated with an aqueous solution of colloidal silica containing 7% solids. Padding was adjusted to deposit 8% silica sol on the duck. The remainder of the treatment and lamination was performed in accordance with the procedure set forth in Example III except that the laminated product contains from 48 to 50% of the same resin as prepared in Example II and is a 6 ply instead of a 10 ply laminate.

An unsized 9.4 oz. duck is laminated in exactly the same way.

The following table shows the effect of sizing and non-sizing on the water adsorption of laminates immersed for long periods of time:

|  | Per Cent Resin in Laminates | Water Absorption (Per Cent Gain in Weight), Immersion, in Days | | | | | | |
|---|---|---|---|---|---|---|---|---|
|  |  | 1 | 2 | 3 | 4 | 5 | 6 | 7 |
| Untreated | 49 | 6.0 | 7.5 | 8.2 | 8.8 | 9.1 | 9.6 | 10.0 |
| Silica Sol 8% | 49 | 3.3 | 4.9 | 5.6 | 6.5 | 6.9 | 7.2 | 7.7 |

These results show that the laminate sized with silica sol is not broken down by long periods of water immersion and that its resistance to water absorption is decidedly superior to an unsized laminate. The above values were obtained by the same testing procedure disclosed in Example IV.

The silica sized laminates of the present invention can be utilized for a wide variety of applications, for example as table or counter tops and as construction materials and/or as electrical insulators in aeroplanes, homes, offices and the like where a strength approaching that of metal or wood construction is required or when a light weight product of good strength characteristics is desired. Such applications are innumerable and are well known since they have been utilized successfully to a considerable degree in various articles of manufacture and commerce.

What is claimed is:

1. A laminated article consisting of laminae of cellulosic fabrics impregnated with colloidal silica and bonded together by means of a resin consisting of the copolymerization product of (1) a vinyl compound selected from the group consisting of styrene, substituted styrene and vinyl esters with (2) a polyester condensation product of (A) a polyhydric alcohol with (B) an organic carboxylic compound selected from the group consisting of (a) a dicarboxylic compound selected from the group consisting of ethylenically unsaturated aliphatic dicarboxylic acids having not more than 8 carbon atoms and anhydrides of such acids, (b) a mixture of (a) and a decarboxylic compound selected from the group consisting of phthalic acid, phthalic anhydride and terephthalic acid, and (c) a mixture of (a) and a monocarboxylic acid selected from the group consisting of saturated and unsaturated mono-carboxylic acids having from 10 to 18 carbon atoms, mixtures (b) and (c) consisting of at least 20 mol per cent of (a).

2. The method of combining laminae of cellulosic fabrics, which comprises impregnating said laminae with a colloidal solution of silica; drying said laminae; impregnating the dry laminae with a liquid resin consisting of a mixture of (1) a vinyl compound selected from the group consisting of styrene, substituted styrene and vinyl esters and (2) a polyester condensation product of (A) a polyester condensation product of (A) a polyhydric alcohol with (B) an organic carboxylic compound selected from the group consisting of (a) a dicarboxylic compound selected from the group consisting of ethylenically unsaturated aliphatic dicarboxylic acids having not more than 8 carbon atoms and anhydrides of such acids, (b) a mixture of (a) and a dicarboxylic compound selected from the group consisting of phthalic acid, phthalic anhydride and terephthalic acid, and (c) a mixture of (a) and a mono-carboxylic acid selected from the group consisting of saturated and unsaturated monocarboxylic acids having from 10 to 18 carbon atoms, the mixtures (b) and (c) consisting of at least 20 mol per cent of (a); and then bonding the impregnated laminae by the application of heat and a small amount of pressure.

3. A method according to claim 2 but further characterized in that the laminae are impregnated with from 1 to 15% by weight of colloidal silica and the resin is supplied in an amount sufficient to provide from 45 to 65% by weight resin, based on the finished laminate.

4. A laminated article consisting of laminae of cellulosic paper impregnated with colloidal silica and bonded by means of a resin consisting of styrene copolymerized with a condensation product of a polyhydric alcohol and a mixture of phthalic anhydride and maleic anhydride, said mixture consisting of at least 20 mol per cent of maleic anhydride.

5. A method of combining laminae of cellulosic paper which comprises impregnating said laminae with a colloidal solution of silica; drying said laminae; impregnating the dry laminae with a liquid resin consisting of styrene and a condensation product of a polyhydric alcohol with a mixture of phthalic anhydride and maleic anhydride, said mixture consisting of at least 20 mol per cent of maleic anhydride; and then bonding the impregnated laminae by the application of heat and a small amount of pressure.

6. A laminated article consisting of laminae of woven cellulosic fabrics impregnated with colloidal silica and bonded by means of a resin consisting of styrene copolymerized with a condensation product of a polyhydric alcohol and maleic anhydride.

7. A laminated article consisting of laminae of woven cellulosic fabrics impregnated with colloidal silica and bonded by means of a resin consisting of styrene copolymerized with a condensation product of a polyhydric alcohol and a mixture of phthalic anhydride and maleic anhydride, said mixture consisting of at least 20 mol per cent of maleic anhydride.

8. A laminated article consisting of laminae of woven cellulosic fabrics impregnated with colloidal silica and bonded by means of a resin consisting of styrene copolymerized with a condensation product of ethylene glycol and maleic anhydride.

9. A laminated article consisting of laminae of woven cellulosic fabrics impregnated with colloidal silica and bonded by means of a resin consisting of styrene copolymerized with a condensation product of ethylene glycol and a mixture of phthalic anhydride and maleic anhydride, said mixture consisting of at least 20 mol per cent of maleic anhydride.

10. The method of combining laminae of woven cellulosic fabrics which comprises impregnating laminae of cellulosic fabrics with a colloidal solution of silica; drying said laminae; impregnating the dry laminae with a liquid resin consisting of styrene and a condensation product of a polyhydric alcohol with maleic anhydride; and then bonding the impregnated laminae by the application of heat and a small amount of pressure.

11. The method of combining laminae of woven cellulosic fabrics which comprises impregnating laminae of cellulose fabrics with a colloidal solution of silica; drying said laminae; impregnating the dry laminae with a liquid resin consisting of styrene and a condensation product of a polyhydric alcohol with a mixture of phthalic anhydride and maleic anhydride, said mixture consisting of at least 20 mol per cent of maleic anhydride; and then bonding the impregnated laminae by the application of heat and a small amount of pressure.

12. The method of combining laminae of woven cellulosic fabrics which comprises impregnating said laminae with a colloidal solution of silica; drying said laminae; impregnatnig the dry laminae with a liquid resin consisting of styrene and a condensation product of ethylene glycol with maleic anhydride; and then bonding the impregnated laminae by the application of heat and a small amount of pressure.

13. The method of combining laminae of woven cellulosic fabrics which comprises impregnating said laminae with a colloidal solution of silica; drying said laminae; impregnating the dry laminae with a liquid resin consisting of styrene and a condensation product of ethylene glycol with a mixture of phthalic anhydride and maleic anhydride, said mixture consisting of at least 20 mol per cent of maleic anhydride; and then bonding the impregnated laminae by the application of heat and a small amount of pressure.

14. A method according to claim 10 but further characterized in that the laminae are impregnated with from 1 to 15% by weight of colloidal silica and the resin is supplied in an amount sufficient to provide from 45 to 65% resin, based on the finished laminate.

15. A method according to claim 11 but further characterized in that the laminae are impregnated with from 1 to 15% by weight of colloidal silica and the resin is supplied in an amount sufficient to provide from 45 to 65% resin, based on the finished laminate.

16. A method according to claim 12 but further characterized in that the laminae are impregnated with from 1 to 15% by weight of colloidal silica and the resin is supplied in an amount sufficient to provide from 45 to 65% by weight resin, based on the finished laminate.

17. A method according to claim 13 but further characterized in that the laminae are impregnated with from 1 to 15% by weight of colloidal silica and the resin is supplied in an amount sufficient to provide from 45 to 65% by weight resin, based on the finished laminate.

DONALD H. POWERS.

REFERENCES CITED

The following references are of record in the file of this patent:

UNITED STATES PATENTS

| Number | Name | Date |
|---|---|---|
| 1,477,938 | Britton | Dec. 18, 1923 |
| 2,058,844 | Vaughn | Oct. 27, 1936 |
| 2,215,048 | McGregor | Sept. 17, 1940 |
| 2,317,891 | Dennison | Apr. 27, 1943 |
| 2,340,728 | Baker et al. | Feb. 1, 1944 |
| 2,347,733 | Christensen | May 2, 1944 |
| 2,414,125 | Rheinfrank | Jan. 14, 1947 |
| 2,432,752 | Gray | Dec. 16, 1947 |
| 2,443,512 | Powers et al. | June 15, 1948 |
| 2,483,754 | Clifton | Oct. 4, 1949 |